UNITED STATES PATENT OFFICE.

CHARLES E. GRAPEWINE, OF SAN DIEGO, CALIFORNIA.

LOTION.

SPECIFICATION forming part of Letters Patent No. 624,925, dated May 16, 1899.

Application filed December 10, 1897. Serial No. 661,441. (Specimens.)

*To all whom it may concern:*

Be it known that I, CHARLES E. GRAPEWINE, of San Diego, in the county of San Diego and State of California, have invented a new and useful Improvement in the Manufacture of Lotions, of which the following is a full, clear, and exact description.

The object of the invention is to provide certain new and useful improvements in the manufacture of lotions to be used as a natural soap for toilet purposes, as an emolient for the skin, to restore faded complexions, to remove and prevent tan, sunburn, and freckles, eradicate acne and pimples, to serve as a dentifrice and shaving lotion, and to cure chapped hands.

The invention consists of a new article of manufacture—a lotion possessing the characteristics hereinafter described and claimed.

In order to produce this new soap, I proceed in detail as follows: The lemons shortly after they have passed the green-color state are picked and then ground and placed in salt water, with which they are cooked until a starchy mass or paste is formed and the water has been evaporated. The mass in this pulp state contains but the substances of the lemon and the salt, and is now strained through a cloth, gauze, sieve, or other strainer of such a fine mesh as to prevent the fibrous matter of the pulp from passing through, suitable means being employed to work or rub the mass sufficiently for the soluble matter to pass through the meshes of the strainer, the fibrous matter being removed from the strainer from time to time as waste. The strained mass obtained is thoroughly mixed by stirring with suitable devices to render the product homogeneous and to form a cream of lemon, which is preferably filled in suitable pliable tubes or other receptacles and is then ready for use while in a semifluid state. Well or overly cured lemons may also be treated in the manner above described, but such lemons yield less cream.

Instead of grinding the lemons into pulp and cooking the latter in salt water the lemons may be cooked whole first in salt water, preferably ocean-water. The pulp or lemons may also be cooked and salt added during the cooking process; but salt or its equivalent is necessary to form the desired cream. About one-half pound of salt is necessary for one gallon of the cream formed, and if ocean-water is used the amount must be such as to yield one-half pound of salt, the water being evaporated during the cooking process.

If it is necessary to thin the product to the required or desired consistency, water is added during the cooking. The cream is then placed in a vessel and left to settle until the separation of the liquid and solid substance becomes pronounced, but the solid substance not yet finally settled in the bottom of the vessel. The latter is now taken hold of and shaken, or the contents of the vessel are gently stirred to finally form a homogeneous mass or cream that is not liable to separate and retains the lemon smell and taste. The separation of the solid substances and the water takes place in from one to five hours, according to the ripeness of the fruit. It is expressly understood, however, that when the cream is prepared as first stated no separation takes place or is necessary, and the cream is filled directly into suitable receptacles.

It is further understood that the article is produced from the oil, the starchy substance of the pulp, rind, and seed, also the juice contained in the lemon, separated from the fibrous and insoluble parts of the lemon, and thoroughly mixed and cooked with the addition of salt.

In using the cream as a soap the part to be cleansed is first wet and then the cream rubbed onto it the same as ordinary soap until the part feels smooth. Rinsing with water will then complete the cleansing process.

Having thus fully described my invention, I claim as new and desire to secure by Letters Patent—

1. As a new article of manufacture, a lotion of semifluid or cream-like consistence, said lotion being homogeneous and consisting essentially of cooked and defibrated lemon and salt.

2. As a new article of manufacture, a lotion of semifluid or cream-like consistence, said lotion being homogeneous and consisting essentially of cooked and defibrated lemon and salt in about the proportions of one-half pound of salt to one gallon of the lemon ingredient, substantially as described.

CHARLES E. GRAPEWINE.

Witnesses:
R. M. WARD,
JNO. F. FORWARD.